US012746603B2

(12) United States Patent
Kobayashi et al.

(10) Patent No.: US 12,746,603 B2
(45) Date of Patent: Sep. 29, 2026

(54) CUTTING TOOL

(71) Applicant: Sumitomo Electric Industries, Ltd., Osaka (JP)

(72) Inventors: Fumiyoshi Kobayashi, Osaka (JP); Anongsack Paseuth, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 58 days.

(21) Appl. No.: 18/997,060

(22) PCT Filed: May 29, 2024

(86) PCT No.: PCT/JP2024/019737
§ 371 (c)(1),
(2) Date: Jan. 18, 2025

(87) PCT Pub. No.: WO2025/248670
PCT Pub. Date: Dec. 4, 2025

(65) Prior Publication Data
US 2026/0008109 A1 Jan. 8, 2026

(51) Int. Cl.
*B23B 27/14* (2006.01)

(52) U.S. Cl.
CPC .......... *B23B 27/14* (2013.01); *B23B 2224/00* (2013.01); *B23B 2228/105* (2013.01); *B23B 2228/36* (2013.01)

(58) Field of Classification Search
None
See application file for complete search history.

(56) References Cited

U.S. PATENT DOCUMENTS

2011/0188950 A1* 8/2011 Ahlgren ................ C23C 14/024 427/580
2014/0370309 A1 12/2014 Endler et al.
(Continued)

FOREIGN PATENT DOCUMENTS

JP 2005-138209 A 6/2005
JP 2015-505902 A 2/2015
(Continued)

OTHER PUBLICATIONS

Written Opinion mailed on Jul. 16, 2024, received for PCT Application PCT/JP2024/019737, filed on May 29, 2024, 7 pages including English Translation.

*Primary Examiner* — Seth Dumbris
(74) *Attorney, Agent, or Firm* — XSENSUS LLP

(57) ABSTRACT

A cutting tool, comprising a substrate and a coating,
wherein the coating comprises a first layer consisting of multiple hard particles,
in the first layer, $N_{Si}/(N_{Ti}+N_{Si})$ is 0.010 to 0.10,
the hard particles have a lamellar structure in which the content of silicon changes periodically,
in a first graph showing results obtained by subjecting the hard particles to line analysis with TEM-EDX, in a coordinate system having the X-axis indicating a distance from any point, P1, and the Y-axis indicating the ratio $N_{Si}/(N_{Ti}+N_{Si})$,
each cycle of the ratio $N_{Si}/(N_{Ti}+N_{Si})$ includes a first minimum value, a first maximum value, a second minimum value, a second maximum value, and a third minimum value along the positive direction of the X-axis, and
the average of the second minimum values is higher than the average of the first minimum values and the third minimum values.

6 Claims, 5 Drawing Sheets

(56) References Cited

U.S. PATENT DOCUMENTS

| | | | | |
|---|---|---|---|---|
| 2016/0040279 | A1* | 2/2016 | Setoyama ............... | C04B 41/52 428/216 |
| 2018/0281078 | A1* | 10/2018 | Hirano .................... | C04B 41/52 |
| 2019/0070668 | A1* | 3/2019 | Sato ........................ | B23B 27/14 |
| 2023/0234141 | A1 | 7/2023 | Harada et al. | |
| 2024/0198430 | A1 | 6/2024 | Paseuth et al. | |

FOREIGN PATENT DOCUMENTS

| | | | |
|---|---|---|---|
| WO | 2022/230363 | A1 | 11/2022 |
| WO | 2023/144867 | A1 | 8/2023 |

* cited by examiner

CUTTING TOOL

CROSS-REFERENCE TO RELATED APPLICATION

The present application is a national stage application, pursuant to 35 U.S.C. § 371, of International Patent Application No. PCT/JP2024/019737, filed May 29, 2024, the entire contents of which are incorporated herein by reference.

TECHNICAL FIELD

The present disclosure relates to a cutting tool.

BACKGROUND ART

Cutting tools having a TiSiCN film on the substrate thereof have been developed until now for improving the abrasion resistance (for example, PTL 1).

CITATION LIST

Patent Literature

PTL 1: WO 2022/230363

SUMMARY OF INVENTION

A cutting tool of the present disclosure is a cutting tool comprising a substrate and a coating disposed on the substrate, wherein the coating comprises a first layer, the first layer consists multiple hard particles, the hard particles consist of titanium, silicon, carbon, and nitrogen, the hard particles have a cubic crystal structure, the first layer has a columnar structure, in the first layer, an average of the ratio of the number of atoms of the silicon $N_{Si}$ to the sum of the number of atoms of the titanium $N_{Ti}$ and the number of atoms of the silicon $N_{Si}$, $N_{Si}/(N_{Ti}+N_{Si})$, is 0.010 or more and 0.10 or less, the hard particles have a lamellar structure in which the content if the silicon changes periodically, in a first graph showing results obtained by subjecting the hard particles to line analysis along a stacking direction of the lamellar structure with an energy dispersive X-ray spectroscope attached to a transmission electron microscope, in a coordinate system having X-axis indicating a distance from any point, P1, in the hard particles, and Y-axis indicating the ratio $N_{Si}/(N_{Ti}+N_{Si})$, each cycle of the ratio $N_{Si}/(N_{Ti}+N_{Si})$ includes the first minimum value, the first maximum value, the second minimum value, the second maximum value, and the third minimum value along the positive direction of the X-axis, and The average of the second minimum values is higher than the average of the first minimum values and the third minimum values.

DETAILED DESCRIPTION

Figure 1:
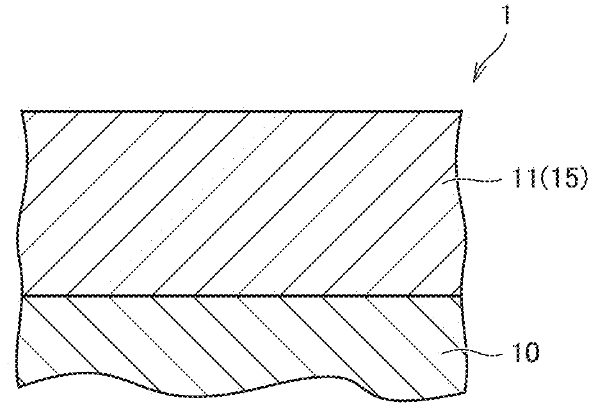
FIG. 1 is a schematic diagram showing an exemplary section of a cutting tool according to Embodiment 1.

Problem to be Solved by the Present Disclosure

A cutting tool with a TiSiCN film, having high hardness, is high in abrasion resistance. If chromium molybdenum steel (SCM435) is subjected to intermittent machining with the cutting tool, the cutting tool may reach the tool life due to the breakage of the coating. A cutting tool has therefore been desired that can have a long tool life especially even after use for intermittent machining of the chromium molybdenum steel.

An object of the present disclosure is to provide a cutting tool that can have a long tool life especially even after use for intermittent machining of the chromium molybdenum steel.

Advantageous Effect of the Present Disclosure

The present disclosure enable providing a cutting tool that can have a long tool life especially even after use for intermittent machining of chromium molybdenum steel.

DESCRIPTION OF EMBODIMENTS

Embodiments of the present disclosure will be first enumerated for description.

(1) A cutting tool of the present disclosure is a cutting tool, comprising a substrate and a coating disposed on the substrate, wherein the coating comprises a first layer, the first layer consists of multiple hard particles, the hard particles consist of titanium, silicon, carbon, and nitrogen, the hard particles have a cubic crystal structure, the first layer has a columnar structure, in the first layer, an average of the ratio of the number of atoms of the silicon $N_{Si}$ to the sum of the number of atoms of the titanium $N_{Ti}$ and the number of atoms of the silicon $N_{Si}$, $N_{Si}/(N_{Ti}+N_{Si})$, is 0.010 or more and 0.10 or less, the hard particles have a lamellar structure in which the content of the silicon changes periodically, in a first graph showing results obtained by subjecting the hard particles to line analysis along a stacking direction of the lamellar structure with an energy dispersive X-ray spectroscope attached to a transmission electron microscope, in a coordinate system having X-axis indicating a distance from any point, P1, in the hard particles, and Y-axis indicating the ratio $N_{Si}/(N_{Ti}+N_{Si})$, each cycle of the ratio $N_{Si}/(N_{Ti}+N_{Si})$ includes the first minimum value, the first maximum value, the second minimum value, the second maximum value, and the third minimum value along the positive direction of the X-axis, and the average of the second minimum values is higher than the average of the first minimum values and the third minimum values.

The present disclosure enables providing a cutting tool that can have a long tool life especially even after use for intermittent machining of chromium molybdenum steel.

(2) In the above-mentioned (1), the cycle width in the direction along the X-axis in the first graph may be 3 nm or more and 20 nm or less. This further improves the tool life.

(3) In the above-mentioned (1) or (2), the difference between the average of the first maximum values and the second maximum values and the average of the second minimum values may be 0.005 or more and 0.040 or less. This further improves the tool life.

(4) In any of the above-mentioned (1) to (3), the first layer may have a thickness of 1.0 μm or more and 15 μm or less. This further improves the tool life.

(5) In any of the above-mentioned (1) to (4), the coating may comprise a second layer disposed between the substrate and the first layer, and the second layer may comprise at least one selected from the group consisting of a TiN layer, a TiC layer, a TiCN layer, a TiBN layer, a TiCNO layer, and an $Al_2O_3$ layer.

This further improves the tool life.

(6) In any of the above-mentioned (1) to (5), the coating comprises a third layer disposed on the outermost surface of the coating, and the third layer may be a TiN layer, a TIC layer, a TiCN layer, a TiBN layer, a TiCNO layer, or an $Al_2O_3$ layer.

This enables facilitating the discrimination of used portions of the cutting tool after use for cutting machining, and further improving the tool life.

DETAILS OF EMBODIMENTS OF THE PRESENT DISCLOSURE

With reference to the following drawings, the cutting tool of the present disclosure will be described. In the drawings of the present disclosure, the same reference signs indicate the same portions or the corresponding portions. The measurement relationships between the lengths, the widths, the thicknesses, and the depths are optionally modified for clarifying and simplifying the drawings, and do not necessarily show actual measurement relationships.

The formal expression "A to B" as used in the present disclosure means A or more and B or less. If a unit is attached to only B without any unit attached to A, the unit of A is the same as thermit of B.

If a compound is represented by a chemical formula in the present disclosure without particular limitation of the atomic ratio, the atomic ratio shall include any conventionally known atomic ratio, and should not be necessarily limited to only the ranges of stoichiometric atomic ratios.

If one or more numerical values are described as each of the lower limit and the upper limit of a numerical range in the present disclosure, also disclosed shall be the combination of any one numerical value described as the lower limit and any one numerical value described as the upper limit.

The terms "comprise", "contain", and "have", and the variations thereof are open-end terms. The open-end terms may further include an additional element (or additional elements) besides an essential element (or elements) or may not include the element (or these elements). The description "consist of" is a closed-end term. Even a configuration expressed by the closed-end term can however include an additional element (or additional elements) as an impurity (or impurities) usually accompanying an essential element (or elements), or an additional element (or additional elements) not related to the target technique.

Embodiment 1: Cutting Tool

A cutting tool in art embodiment of the present disclosure (hereinafter also referred to as the "present embodiment") will be described with FIGS. 1 to 4. A cutting tool 1 of the present embodiment is a cutting tool 1, comprising a substrate 10 and a coating on substrate 10, wherein coating 15 comprises a first layer 11, first layer 11 consists of multiple hard particles, the hard particles consist of titanium, silicon, carbon, and nitrogen, the hard particles have a cubic crystal structure, first layer 11 has a columnar structure, in first layer 11, an average of the ratio of the number of silicon atoms $N_{Si}$ to the sum of the number of titanium atoms $N_{Ti}$ and the number of silicon atoms $N_{Si}$, $N_{Si}/(N_{Ti}+N_{Si})$, is 0.010 or more and 0.10 or less, the hard particles have a lamellar structure in which the content of silicon changes periodically, in a first graph showing results obtained by subjecting the hard particles to line analysis along a stacking direction of the lamellar structure with an energy dispersive X-ray spectroscope attached to a transmission electron microscope, in a coordinate system having, the X-axis indicating a distance from any point, P1, in the hard particles, and the Y-axis indicating the ratio $N_{Si}/(N_{Ti}+N_{Si})$, each cycle of the ratio $N_{Si}/(N_{Ti}+N_{Si})$ includes the first minimum value, the first maximum value, the second minimum value, the second maximum value, and the third minimum value along the positive direction of the X-axis, and the average of the second minimum values is higher than the average of the first minimum values and the third minimum values.

The cutting tool of the present disclosure can have a long tool life especially even after use for intermittent machining of chromium molybdenum steel. Although the reason therefor is not clear, it is conjectured that the reason is as follows.

(i) in the cutting tool of the present embodiment, the coating comprises the first layer consisting of the multiple hard particles. Since the hard particles consist of titanium, silicon, carbon, and nitrogen, and have a cubic crystal structure, the first layer has high hardness. The cutting tool therefore has high abrasion resistance.

(ii) The hard particles in the cutting tool of the present embodiment have a lamellar structure in which the content of silicon changes periodically. Even though a change in the content of silicon in the hard particles therefore strains the crystal lattice to cause cracks during cutting, the development of cracks in the stacking directions of the lamellar structure is suppressed.

(iii) Each cycle of the ratio $N_{Si}/(N_{Ti}+N_{Si})$ includes the first minimum value, the first maximum value, the second minimum value, the second maximum value, and the third minimum value along the positive direction of the X-axis in the first graph of the hard particles of the cutting tool of the present embodiment, and the average of the second minimum values is higher than the average of the first minimum values and the third minimum values. The presence of the second minimum value moderately reduces lattice strain due to the differences between the first minimum value and the third minimum value, which are relatively the lowest ratios as $N_{Si}/(N_{Ti}+N_{Si})$, and the first maximum value and the second maximum value, which are relatively high ratios as $N_{Si}/(N_{Ti}+N_{Si})$, to suppress the development of cracks orthogonal to the stacking directions of the lamellar structure. The cutting tool therefore has high breakage resistance.

<Cutting Tool>

As shown in FIG. 1, cutting tool 1 of the present embodiment comprises substrate 10 and coating 15 disposed on substrate 10. FIG. 1 shows coating 15 constituted of only first layer 11. Coating 15 may at least partially cover a portion of the substrate related to cutting, or may cover the entire surface of the substrate. The portion of the substrate related to cutting means a region within 500 μm from the cutting edge ridgeline on the surface of the substrate. As long as the effect of the present disclosure is not deteriorated, even the coating covering the substrate only partially or the coating having different configurations from one portion to another does not depart from the scope of the present disclosure.

<Type of Cutting Tool>

For example, the cutting tool of the present disclosure can be a drill, an end mill (for example, a ball end mill), an indexable cutting insert for drills, an indexable cutting insert for end mills, an indexable cutting insert for milling, an indexable cutting insert for lathe turning, a metal saw, a gear-cutting tool, a reamer, or a tap.

<Substrate>

In the present embodiment, a conventionally known substrate is usable. For example, the material of the substrate may be cemented carbide (for example, WC-based cemented carbide containing tungsten carbide and cobalt, the cemented carbide can contain, for example, carbonitrides of Ti, Ta, and Nb), cermet (containing TiC, TiN, TiCN, or others as the main component), high-speed steel, ceramic (for example, titanium carbide, silicon carbide, silicon nitride, aluminum nitride, or aluminum oxide), a cubic boron nitride sintered material, or a diamond sintered material.

The substrate may consist of cemented carbide containing tungsten carbide and cobalt, and the contented carbide may contain cobalt at a content of 5% by mass or more and 11% by mass or less. This enables the substrate to have excellent balance between hardness and strength at high temperature and excellent characteristics as the substrate for the cutting tool for the above-mentioned use. If WC-based cemented carbide is used as the substrate, the structure thereof may contain free carbon and abnormal layers referred to as η phases or ε phases.

The surface of the substrate may be modified. For example, in the case of cemented carbide, a β-removed layer may be formed on the surface. In the case of cermet, a surface-hardened layer may be formed. Even though the surface of the substrate is modified, the desired effect is exhibited.

If the cutting tool is air indexable cutting insert, the substrate may have a chip breaker or not. The cutting edge ridgeline may have any shape of, for example, a sharp edge (edge that is a line of interaction of the rake face and the flank face), a honed, sharp edge (rounded sharp edge), a negative land (chamfered sharp edge), and a sharp edge subjected to the combination of honing processing and negative land processing.

<Coating>

<<Configuration of Coating>>

In the present embodiment, the coating comprises the first layer. As long as the coating of the present embodiment comprises the first layer, the coating may comprise other layers.

Figure 2:
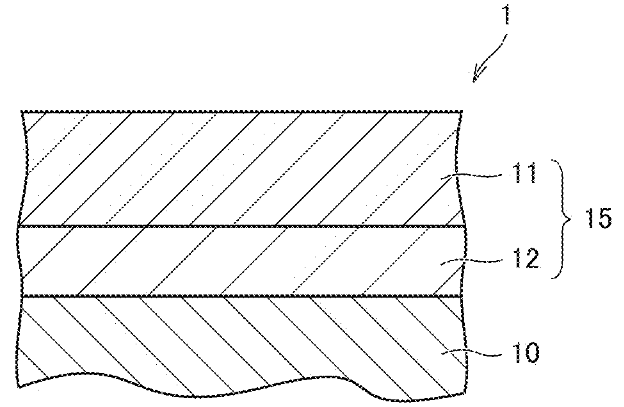
FIG. 2 schematic diagram showing another exemplary section of a cutting tool according to Embodiment 1.

As shown in FIG. 2, coating 15 of cutting tool 1 may comprise a second layer 12 disposed between substrate 10 and first layer 11.

Figure 3:
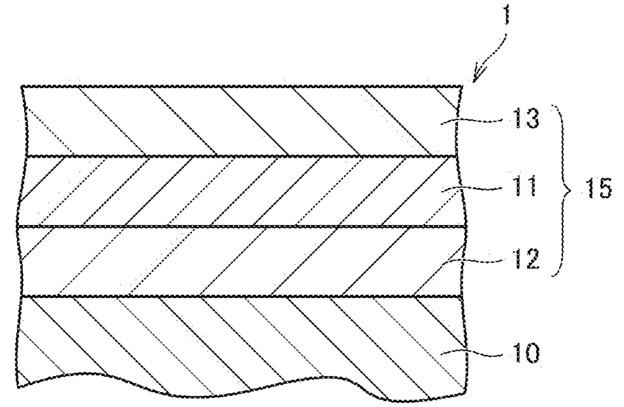
FIG. 3 is a schematic diagram showing another exemplary section of a cutting tool according to Embodiment 1.
Figure 4:
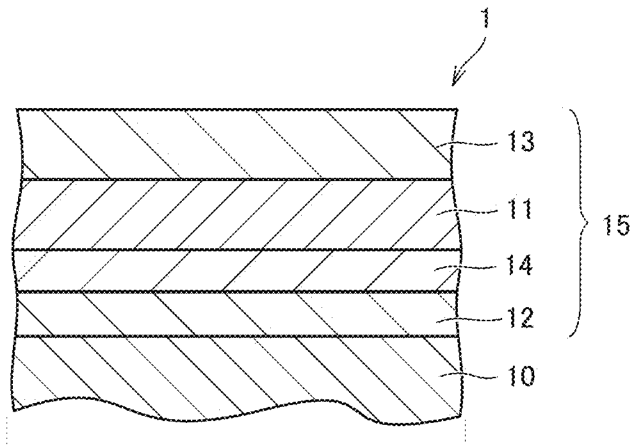
FIG. 4 is a schematic diagram showing another exemplary section of a cutting tool according to Embodiment 1.

As shown in FIG. 3, coating 15 of cutting tool 1 may comprise a third layer 13 disposed on the outermost surface of coating 15.

Details of the first layer, the second layer, and the third layer will be described below.

<<Thickness of Coating>>

In the present embodiment, the coating may have a thickness of 1 μm or more and 30 μm or less. The thickness of the coating used here means the thickness of the entire coating. If the entire coating has a thickness of 1 μm or more, the coating can have high abrasion resistance. Meanwhile, if the entire coating has a thickness of 30 μm or less, this enables inhibiting great stress applied between the coating and the substrate from exfoliating or breaking the coating. The entire coating may have a thickness of 5 μm or more and 25 μm or less, or 8 μm or more and 20 μm or less.

In the present disclosure, the thickness of the coating is measured in the following procedure. The cutting tool is cut in a section parallel to the normal direction of the surface thereof to obtain a measurement sample having an exposed section of the coating. The measurement sample is observed through a scanning transmission electron microscope (STEM) to measure the thickness of the coating. The measurement sample is a thin section processed, for example, with an ion slicer. Examples of the scanning transmission electron microscope include JEM-2100F(™), which is available from JEOL Ltd. As the measurement conditions, the acceleration voltage is 200 kV, and the amount of current is 0.3 nA.

The measurement sample is observed at a magnification of 10000. In the electron microscope image, a rectangular measurement visual field is set having "a side that is parallel to the surface of the cutting tool and has a length of 100 μm" and "a side that is longer than the entire thickness of the coating". The thicknesses of the coating are measured at ten points in the measurement visual field. The average value thereof is defined as the"thickness of the coating". The thicknesses (average thicknesses) of the layers described below are also measured and calculated in the same way.

It has been confirmed that even though the thicknesses of the identical sample are measured at randomly changed selected points in the measurement visual field multiple times, the results of measurement scarcely vary.

<First Layer>

<<Composition of First Layer>>

In the present embodiment, the first layer consists of the multiple hard particles. The hard particles consist of titanium, silicon, carbon, and nitrogen. In the first layer of the present embodiment, the average of the ratio of the number of silicon atoms $N_{Si}$, to the sum of the number of titanium atoms $N_{Ti}$ and the number of silicon atoms $N_{Si}$, $N_{Si}/(N_{Ti}+N_{Si})$, is 0.010 or more and 0.10 or less. If the average of $N_{Si}/(N_{Ti}+N_{Si})$ is 0.010 or more, the abrasion resistance improves. If the average of $N_{Si}/(N_{Ti}+N_{Si})$ is 0.10 or less, satisfactory welding resistance can be obtained.

The average of $N_{Si}/(N_{Ti}+N_{Si})$ may be 0.02 or more and 0.09 or less 0.02 or more and 0.07 or less, or 0.02 or more and 0.05 or less.

In the present disclosure, the average of $N_{Si}/(N_{Ti}+N_{Si})$ in the first layer are measured in the following procedure.

(A1) The cutting tool is cut out along the normal line of the surface of the cutting tool with diamond wire to expose the section of the first layer. The exposed section is subjected to focused ion beam processing (hereinafter also referred to as "FIB processing") to be mirror-finished.

(A2) The section of the first layer is subjected to rectangular analysis with an energy dispersive X-ray spectroscope (EDX) attached to a transmission electron microscope (TEM) (TEM-EDX) to specify the composition of the first layer. The rectangular analysis is performed in three unoverlapped rectangular measurement regions with a size of 0.5 μm×2 μm set in the section of the first layer. $N_{Si}/(N_{Ti}+N_{Si})$ is calculated in each of the three measurement regions. The average of $N_{Si}/(N_{Ti}+N_{Si})$ at the three measurement regions is calculated. The averages thereof correspond to the average of $N_{Si}/(N_{Ti}+N_{Si})$ in the first layer.

It has been confirmed that even though the ratios of the identical sample are measured at randomly changed selected points in the measurement visual field multiple times, the results of measurement scarcely vary.

<<Structure of First Layer>>

In the present embodiment, the first layer has a columnar structure. In this case, the first layer is resistant to stress in the shear direction, and improves in abrasion resistance. Furthermore, since the first layer has few grain boundaries in the direction vertical to the film thickness, the first layer has few starting points of destruction, and also improves in breakage resistance.

In the present disclosure, the first layer has a columnar structure, and this means that the percentage of the number of first hard particles having an aspect ratio of 3 or more N1 to the number of all the hard particles constituting the first layer N, (N1/N)×100, is 60% or more. It is specifically confirmed in the following procedure that the first layer has a columnar structure.

(B1) The cutting tool is cutout along the normal line of the surface of the cutting tool with diamond wire to expose the section of the first layer. The exposed section is subjected to FIB processing to be mirror-finished.

(B2) The section subjected to FIB processing is EBSD-analyzed with a field emission scanning electron microscope (FE-SEM) comprising an electron backscatter diffraction apparatus (EBSD apparatus) (product name: "SUPRA35VP", which is available from Carl Zeiss) under the following measurement conditions. The regions to be EBSD-analyzed (hereinafter also referred to as analysis regions) are three unoverlapped rectangular regions set in the first layer. The analysis region is a rectangle having a side with a length of 20 μm or more in the direction parallel to the substrate. The length of the analysis regions in the thicknesswise direction of the coating can be suitably set depending on the thickness of the first layer. For example, the length of the analysis regions in the thicknesswise direction of the coating is set at 90% or more of the thickness of the first layer.

(Measurement Conditions)

Acceleration voltage: 15 kV
Current value: 1.8 nA
Irradiation current: 60 μm (HC is present.)
Exp: Long 0.03 s
Binning: 8×8
WD: 15 mm
Tilt: 70°
Step size: 0.02 μm
BKD: Background Subtraction,
Dynamic Background Subtraction,
Normalize Intensity histogram
Photographic magnification: 20000 times
Grain boundary definition: 15° or more (B3) Among data collected by EBSD analysis, only data satisfying CI>0.1 are recognized by a CI Dilation method (single Interation) and Grain CI standardization to perform clean-up processing. The CI value is calculated by the Voting method. The CI value is specifically found in accordance with the expression CI=(V1−V2)/Videal (V1: First solution, V2: Second solution, Videal: Ideal solution).

(B4) The above-mentioned results of the EBSD analysis are assayed by commercially available software (trade name: "OIM7.1", which is available from TSL Solutions) to make IPF maps (inverse pole Figure maps) of the above-mentioned analysis regions. If the misorientation between adjacent measurement points is 15° or more, a crystal grain boundary is defined therebetween for making the IPF maps. The IPF maps show the shapes of crystal grains, and also show the orientations of the crystal grains classified by color.

(B5) The aspect ratios of all the hard particles in the IPF maps of the analysis regions are measured by the above-mentioned software ("OIM7.1"). The aspect ratio of one of the hard particles is the ratio of the minor axis b to the major axis a of the hard particles, namely b/a. In the present disclosure, the major axis a is the maximum diameter of the hard particle observed in the above-mentioned section, and the minor axis b is the maximum diameter of the hard particle along the direction orthogonal to the major axis a. In the present disclosure, the hard particles in the IPF maps of the analysis regions include both of hard particles entirely included in the IPF maps of the analysis regions and hard particles at least partially included in the IPF maps of the analysis regions.

(B6) The percentage of the number of first hard particles having an aspect ratio of 3 or more n1 to the number of all the hard particles n in each of the IPF maps of the analysis regions, (n1/n)×100, is calculated. The average of the percentages, (n1/n)×100, in the IPF maps of the three analysis regions corresponds to the percentage of the number of first hard particles having an aspect ratio of 3 or more N1 to the number of all the hard particles constituting the first layer N, (N1/N)×100. If the percentage (N1/N)×100 is 60% or more, it is confirmed that the first layer has a columnar structure.

It has been confirmed that even though the percentages of the identical sample are measured at changed positions to be cut of the cutting tool or in changed measurement regions multiple times, the results of measurement scarcely vary.

<Hard Particles>

<<Composition of Hard Particles>>

In the present embodiment, the hard particles consist of titanium, silicon, carbon, and nitrogen. As long as the effect of the present disclosure is not deteriorated, the hard particles can contain inevitable impurity elements besides titanium, silicon, carbon, and nitrogen. The hard particles may consist of titanium, silicon, carbon, nitrogen, and inevitable impurity elements. Examples of the inevitable impurity elements include chlorine, cobalt, tungsten, and oxygen. For example, the content of the inevitable impurity elements in the hard particles can be 0.5% by atom or less. The contents of the inevitable impurity elements in the hard particles are measured with a TEM-EDX.

<<Crystal Structure of Hard Particles>>

In the present embodiment, the hard particles have a cubic crystal, structure. If the hard particles have a cubic crystal structure, the first layer has both high abrasion resistance and high toughness. It can be confirmed by selected area electron diffraction pattern analysis that the hard particles have a cubic crystal structure.

<<First Graph>>

In the present embodiment, the hard particles have the lamellar structure in which the content of silicon changes periodically. In a first graph showing the results obtained by subjecting the hard particles to line analysis along the stacking direction of the lamellar structure with at an energy dispersive X-ray spectroscope attached to a transmission electron microscope (TEM-EDX), in the coordinate system having the X-axis indicating a distance from any point, P1, in the hard particles, and the Y-axis indicating the ratio $N_{Si}/(N_{Ti}+N_{Si})$, each cycle of the ratio $N_{Si}/(N_{Ti}+N_{Si})$ includes the first minimum value, the first maximum value, the second minimum value, the second maximum value, and the third minimum value along the positive direction of the X-axis, and the average of the second minimum values is higher than the average of the first minimum values and the third minimum values. The first minimum value, the first maximum value, the second minimum value, the second maximum value, and the third minimum value are each represented as the ratio $N_{Si}/(N_{Ti}+N_{Si})$. The above-mentioned first graph is acquired in the following procedure.

(C1) The cutting tool is cut out along the normal line of the surface of the cutting tool with diamond wire to expose the section of the first layer. The exposed section is subjected to FIB processing to be mirror-finished.

(C2) The section subjected to the FIB processing is observed through a bright field scanning electron microscope (BF-SEM) to specify one hard particle, followed by obtaining a BF-STEM image of the one specified hard particle.

(C3) In the above-mentioned BF-STEM image, a measurement region (size: 100 nm×100 nm) is set so as to include a region in which ten or more layers shown as white (hereinafter also described as "white layers") and ten or more layers shown as black (hereinafter also described as "black layers") are stacked. The white layers are regions containing silicon at a low content. The black layers are regions containing silicon at a high content.

(C4) In the measurement region in the above-mentioned BF-STEM image, the stacking directions of the white layers and the black layers are specified. Specifically, the selected area electron diffraction pattern is aligned with the stacking directions of the white layers and the black layers, and the stacking directions are specified based on the directions shown by the diffraction spots. The stacking directions correspond to the stacking directions of the lamellar structure.

(C5) Line analysis is performed along the stacking directions of the lamellar structure in the measurement region in the above-mentioned BF-STEM image with a TEM-EDX to measure the composition. In the line analysis, the beam diameter is 0.5 nm or less, the scanning interval is 0.5 nm, and the length of the line analysis is 50 nm.

(C6) The first graph is created showing the obtained results of line analysis in the coordinate system having the X-axis indicating the distance from any point P1 in the hard particles and the Y-axis indicating the ratio $N_{Si}/(N_{Ti}+N_{Si})$.

If the maximum values and the minimum values alternately appear with an increase in the distance from point P1 in the first graph, it is determined that the hard particles have the lamellar structure in which the content of silicon changes periodically.

Figure 5:
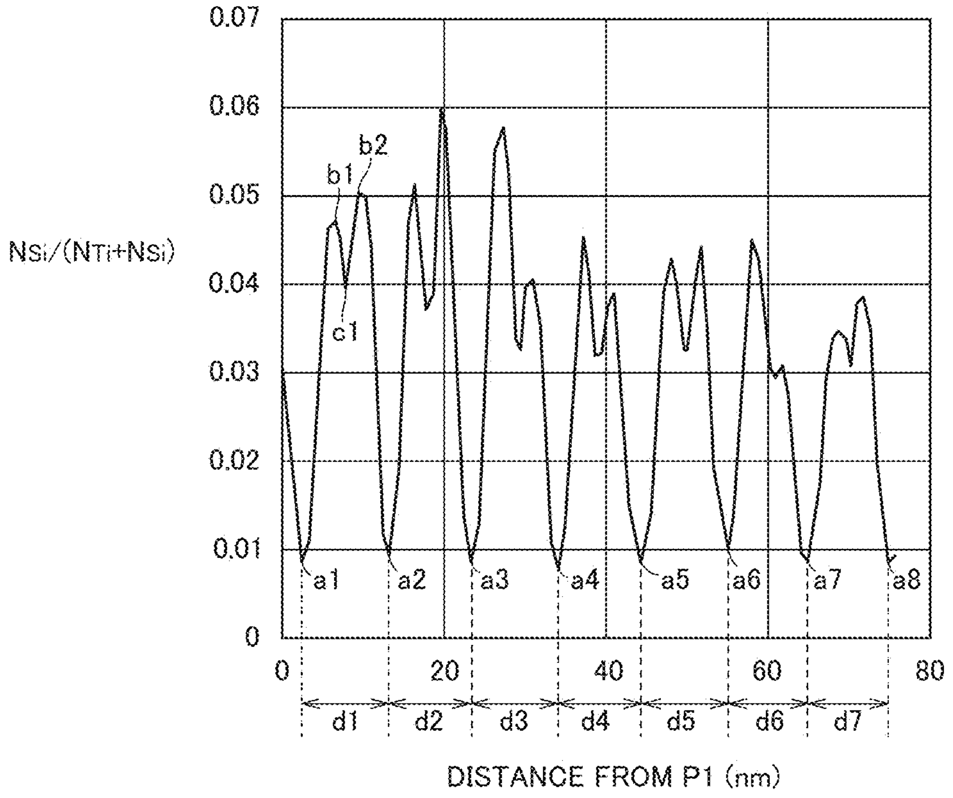
FIG. 5 is an exemplary first graph acquired in a cutting tool according to Embodiment 1.

FIG. 5 is an exemplary first graph acquired in the present embodiment. In the first graph of FIG. 5, the X-axis indicates the distance from any point P1 in the hard particles, and the Y-axis indicates the ratio $N_{Si}/(N_{Ti}+N_{Si})$. As shown in the first graph of FIG. 5, the first graph acquired in the present embodiment has the minimum values a1 to a8, which are relatively the lowest as the ratio $N_{Si}/(N_{Ti}+N_{Si})$. Among the minimum values a1 to a8, the distances between adjacent minimum values, d1 to d7, each correspond to a cycle of the ratio $N_{Si}/(N_{Ti}+N_{Si})$.

Each cycle of the ratio $N_{Si}/(N_{Ti}+N_{Si})$ includes the first minimum value, the first maximum value, the second minimum value, the second maximum value, and the third minimum value along the positive direction of the X-axis. For example, the cycle d1 of the ratio $N_{Si}/(N_{Ti}+N_{Si})$ in the first graph in FIG. 5 includes the minimum value a1, the maximum value b1, the minimum value c1, the maximum value b2, and the minimum value a2 along the positive direction of the X-axis. The minimum value a1 corresponds to the first minimum value. The maximum value b1 corresponds to the first maximum value. The minimum value c1 corresponds to the second minimum value. The maximum value b2 corresponds to the second maximum value. The minimum value a2 corresponds to the third minimum value. The minimum value a2 corresponds to the third minimum value in the cycle d1, and corresponds to the first minimum value in the cycle d2.

In the present disclosure, any the cycles adjacent to each other are specified in the first graph, and the average of the second minimum values and the average of the first minimum values and the third minimum values are calculated based on the second minimum values, the first minimum values, and the third minimum values included in the five cycles.

The average of the first maximum values and the second maximum values may be 0.010 or more and 0.120 or less, 0.020 or more and 0.110 or less, or 0.030 or more and 0.100 or less.

The average of the second minimum values may be 0.008 or more and 0.100 or less, 0.010 or more and 0.090 or less, or 0.020 or more and 0.080 or less.

The average of the first minimum values and the third minimum values may be 0.003 or more and 0.090 less, 0.005 or more and 0.080 or less, or 0.010 or more and 0.070 or less.

The difference between the average of the first maximum values and the second maximum values and the average of the second minimum values may be 0.005 or more and 0.040 or less, 0.010 or more and 0.040 or less, or 0.010 or more and 0.025 or less. This further facilitates obtaining the effect of reducing lattice strain due to the presence of the second minimum value.

The difference between the average of the first minimum value and the third minimum value and the average of the first maximum values and the second maximum values may be 0.007 or more and 0.050 or less, 0.010 or more and 0.050 or less, or 0.010 or more and 0.030 or less. This further facilitates obtaining the effect of suppressing the development of cracks due to lattice strain resulting from a change in the content of silicon.

The above-mentioned ranges can be optionally combined as the above-mentioned average of the first maximum values and the second maximum values, average of the second minimum values, average of the first minimum values and the third minimum values, difference between the average of the first maximum values and the second maximum values and the average of the second minimum values, and difference between the average of the first minimum values and the third minimum values and the average of the first maximum values and the second maximum values.

In the hard particles, regions near the first minimum values and the third minimum values indicate layers containing silicon at relatively the lowest contents (hereinafter also described as "low silicon-concentration layers"), regions near the first maximum values and the second maximum values indicate layers containing silicon at relatively the highest contents (hereinafter also described as "high silicon-concentration layers"), and regions near the second minimum values can be also expressed as intermediate silicon-concentration layers, containing silicon at concentrations between the concentrations of the high silicon-concentration layers and the concentrations of the low silicon-concentration layers. That is, it can also be expressed that a cycle of the lamellar structure in the hard particles includes a low silicon-concentration layer, a high silicon-concentration layers, an intermediate silicon-concentration layer, a high silicon-concentration layers, and a low silicon-concentration layer along the stacking direction of the lamellar structure.

In the present embodiment, the cycle width in the direction along the X-axis in the first graph may be 3 nm or more and 20 nm or less. This facilitates maintaining the lattice strain in the hard particles, further suppresses the development of cracks in the coating, and further improves the breakage resistance of the cutting tool. The cycle width of the silicon concentration may be 3 nm or more and 15 nm or less, or 5 nm or more and 10 nm or less.

In the present disclosure, the above-mentioned cycle width corresponds to the average of the cycle widths of any five cycles adjacent to each other in the first graph.

It has been confirmed that even though hard particles different from the hard particles specified in the identical sample in the above-mentioned (C2) are measured for the above-mentioned items multiple times, the measurement results thereof scarcely vary.

<<Thickness of First Layer>>

In the present embodiment, the first layer may have a thickness of 1.0 μm or more and 15 μm or less. If the first layer has a thickness of 1.0 μm or more, the first layer can have high abrasion resistance. Meanwhile, if the first layer has a thickness of 15 μm or less, this enables inhibiting the coating from being exfoliated or broken by great stress applied between the coating and the substrate during cutting machining. The first layer may have a thickness of 4 μm or more and 15 μm or less, or 6 μm or more and 10 μm or less.

<Second Layer>

The coating of the present embodiment may comprise the second layer disposed between the substrate and the first layer. The second layer may comprise at least one selected from the group consisting of a TiN layer, a TiC layer, a TiCN layer, a TiBN layer, a TiCNO layer, and an $Al_2O_3$ layer.

If the TiN layer, the TiC layer, the TiCN layer, the TiBN layer, or the TiCNO layer is disposed as the second layer directly on the substrate, the adhesion between the coating and the substrate can be enhanced. The use of the $Al_2O_3$ layer as the second layer enables enhancing the oxidation resistance of the coating. The second layer may have an average thickness of 0.1 μm or more and 20 μm or less. This enables the coating to have high abrasion resistance and breakage resistance.

<Third Layer>

The coating of Embodiment 1 may comprise the third layer disposed on the outermost surface of the coating. The third layer may be a TiN layer, a TiC layer, a TiCN layer, a TiBN layer, a TiCNO layer, or an $Al_2O_3$ layer. Since the TiN layer has a clear color (exhibits a gold color), the use of the TiN layer as the third layer advantageously facilitates the discrimination of used portions of the cutting tool after use for cutting machining. The use of the TiC layer, the TiCN layer, the TiBN layer, or the TiCNO layer as the third layer enables improving the slidability of the coating. The use of the $Al_2O_3$ layer as the third layer enables improving the oxidation resistance of the coating.

The third layer may have an average thickness of 0.5 μm or more and 10 μm or less. This enables improving the adhesion between the third layer and the layer adjacent thereto.

Embodiment 2: Method for Manufacturing Cutting Tool

An exemplary method for manufacturing the cutting tool according to Embodiment 1 will be described. The method for manufacturing the cutting tool according to Embodiment 1 can comprise the first step of preparing a substrate and the second step of forming a coating on the substrate to obtain the cutting tool.

<First Step>

In the first step, the substrate is prepared. Since details of the substrate is described in Embodiment 1, the description thereof is not repeated.

<Second Step>

In the second step, the coating is then formed on the substrate to obtain the cutting tool. The coating is formed, for example, with a CVD apparatus shown in FIG. 6. In CVD apparatus 50, multiple substrate-setting jigs 52 holding substrates 10 can be installed, and these are covered with a reaction vessel 53 made of heat-resistant alloy steel. Reaction vessel 53 is surrounded by a thermostat 54. This thermostat 54 can control the temperature in reaction vessel 53.

In CVD apparatus 50, a nozzle 56 with three gas flow channels through which raw material gases pass (a first gas flow channel 55, a second gas flow channel 57, and the other gas flow channel not shown in the figure) is disposed: The nozzle 56 is disposed through a region in which substrate-setting jigs 52 are disposed. Nozzle 56 has multiple injection holes for jetting the gases passed through the gas flow channels near substrate-setting jigs 52.

Figure 7:
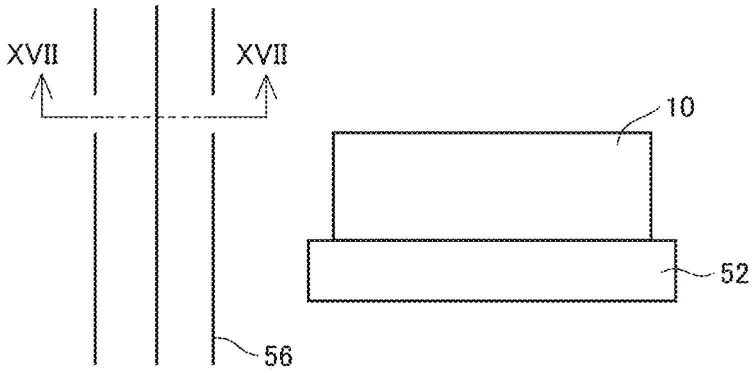
FIG. 7 is an enlarged view of the region VII in FIG. 6.
Figure 8:
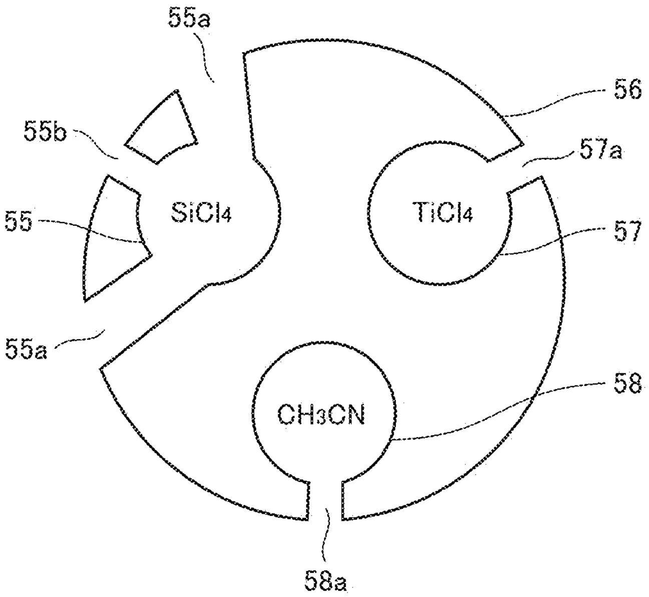
FIG. 8 is a sectional view of a nozzle 56 taken along the line XVII-XVII in FIG. 7.

FIG. 8 is a sectional view of nozzle 56 taken along the line XVII-XVII in FIG. 7. As shown in FIG. 8, nozzle 56 has first gas flow channel 55, second gas flow channel 57, and third gas flow channel 58. $SiCl_4$ gas passes through first gas-flow channel 55, $TiCl_4$ gas passes through second gas flow channel 57, and $CH_3CN$ gas passes through third gas flow channel 58.

First gas flow channel 55 communicates with two first injection holes 55*a* and one second injection hole 55*b*. Gas passed through first gas flow channel 55 is injected from first injection holes 55*a* and second injection hole 55*b* to the substrates. The hole diameter of first injection holes 55*a* is larger than the hole diameter of second injection hole 55*b*.

Second gas flow channel 57 communicates with a third injection hole 57*a*. The gas passed through second gas flow channel 57 is injected front third injection hole 57*a* to the substrates. Third gas flow channel 58 communicates with a fourth injection hole 58*a*, and the gas passed through third gas flow channel 58 is injected from fourth injection hole 58*a* to the substrates.

For example, $H_2$ gas, $N_2$ gas, or Ar gas may be used as carrier gas. The carrier gas is injected from the first injection hole, the second injection hole, the third injection hole, and the fourth injection hole. Gases containing the raw material gases and the carrier gas in the present disclosure are described as reaction gases.

The first layer is formed while the nozzle is rotated. First injection holes 55*a* and second injection hole 55*b* for injecting $SiI_4$ gas are different in hole diameter. The hard particles contained in the first layer can therefore have a lamellar structure in which the content of silicon changes periodically. Furthermore, each cycle of the ratio $N_{Si}/(N_{Ti}+N_{Si})$, includes the first minimum value, the first maximum value, the second minimum value, the second maximum value, and the third minimum value along the positive direction of the X-axis in a first graph-acquired in the hard particles, and the average of the second minimum values is higher than the average of the first minimum values and the third minimum values.

In this step, the temperature of the substrates in the reaction vessel is 800° C. to 900° C., and the pressure in the reaction vessel is 50 hPa to 140 hPa. The flow rates of the raw material gases and the coating formation time can be adjusted to control the thickness of the first layer. The rotational speed of the nozzle and the coating formation times can be adjusted to control the cycle width in the direction along the X-axis in the first graph.

The total gas flow rate of the reaction gases is adjusted to 90 L/minutes to 150 L/minutes during the formation of the first layer. The "total gas flow rate" as used herein refers to the total volumetric flow rate into the CVD furnace per unit time assuming that the gases under the standard conditions (0° C. and 1 atom) are ideal gases.

If the coating comprises at least one of the second layer, an intermediate layer, and the third layer, these layers can be formed by a conventionally known method.

Other Steps

The substrate having the coating is then cooled. For example, the rate of cooling does not exceed 5° C./min, and decreases with a reduction in the temperature of the substrate.

A heat treatment step such as annealing and a surface treatment step such as surface grinding or shot blasting can be performed besides the above-mentioned steps.

The cutting tool of Embodiment 1 can be obtained by the above-mentioned manufacturing method.

EXAMPLES

The present embodiments will be described by Examples further specifically. The present embodiments are not, however, limited by these Examples.

<Preparation of Substrate>

Substrates made of cemented carbide was prepared. The substrates have a composition of 6% by mass of Co and 1.5% by mass of NbC, with the balance being WC. The substrates have a shape of CNMG120408N-GU.

<Formation of Coating>

Coatings was formed on the substrates by CVD. Table 1 and 2 show the configurations of the coatings and the thicknesses of the layers of the samples. The signs "_" shown in spaces of the tables mean that the layers are absent. The first layer consists of multiple hard particles, and the hard particles consist of titanium, silicon, carbon, and nitrogen. The second layer and the third layer are formed by conventionally known CVD.

TABLE 1

| | Coating | | | | | |
|---|---|---|---|---|---|---|
| | First layer | | Second layer | | Third layer | |
| Sample No. | $N_{Si}/(N_{Ti}+N_{Si})$ | Thickness µm | Composition | Thickness µm | Composition | Thickness µm |
| 1 | 0.010 | 7.5 | — | — | — | — |
| 2 | 0.030 | 7.4 | — | — | — | — |
| 3 | 0.050 | 7.5 | — | — | — | — |
| 4 | 0.030 | 7.4 | — | — | — | — |
| 5 | 0.030 | 7.4 | — | — | — | — |
| 6 | 0.030 | 1.3 | — | — | — | — |
| 7 | 0.030 | 14.7 | — | — | — | — |
| 8 | 0.030 | 7.4 | TiN | 0.3 | — | — |
| 9 | 0.030 | 7.4 | — | — | $Al_2O_3$ | 3.1 |
| 10 | 0.030 | 7.4 | — | — | — | — |
| 11 | 0.030 | 7.4 | — | — | — | — |
| 12 | 0.030 | 0.8 | — | — | — | — |
| 13 | 0.030 | 15.8 | — | — | — | — |
| 14 | 0.030 | 7.4 | — | — | — | — |
| 15 | 0.030 | 7.4 | — | — | — | — |
| 1-1 | 0.008 | 7.5 | — | — | — | — |
| 1-2 | 0.030 | 7.4 | — | — | — | — |
| 1-3 | 0.030 | 7.4 | — | — | — | — |

TABLE 2

| | Coating | | | | | |
|---|---|---|---|---|---|---|
| | First layer | | Second layer | | Third layer | |
| Sample No. | $N_{Si}/(N_{Ti}+N_{Si})$ | Thickness μm | Composition | Thickness μm | Composition | Thickness μm |
| 21 | 0.055 | 7.5 | — | — | — | — |
| 22 | 0.080 | 7.4 | — | — | — | — |
| 23 | 0.100 | 7.5 | — | — | — | — |
| 24 | 0.080 | 7.4 | — | — | — | — |
| 25 | 0.080 | 7.4 | — | — | — | — |
| 26 | 0.080 | 1.3 | — | — | — | — |
| 27 | 0.080 | 14.7 | — | — | — | — |
| 28 | 0.080 | 7.4 | TiN | 0.3 | — | — |
| 29 | 0.080 | 7.4 | — | — | $Al_2O_3$ | 3.1 |
| 30 | 0.080 | 7.4 | — | — | — | — |
| 31 | 0.080 | 7.4 | — | — | — | — |
| 32 | 0.080 | 0.8 | — | — | — | — |
| 33 | 0.080 | 15.8 | — | — | — | — |
| 34 | 0.080 | 7.4 | — | — | — | — |
| 35 | 0.080 | 7.4 | — | — | — | — |
| 2-1 | 0.110 | 7.5 | — | — | — | — |
| 2-2 | 0.080 | 7.4 | — | — | — | — |
| 2-3 | 0.080 | 7.4 | — | — | — | — |

Figure 6:
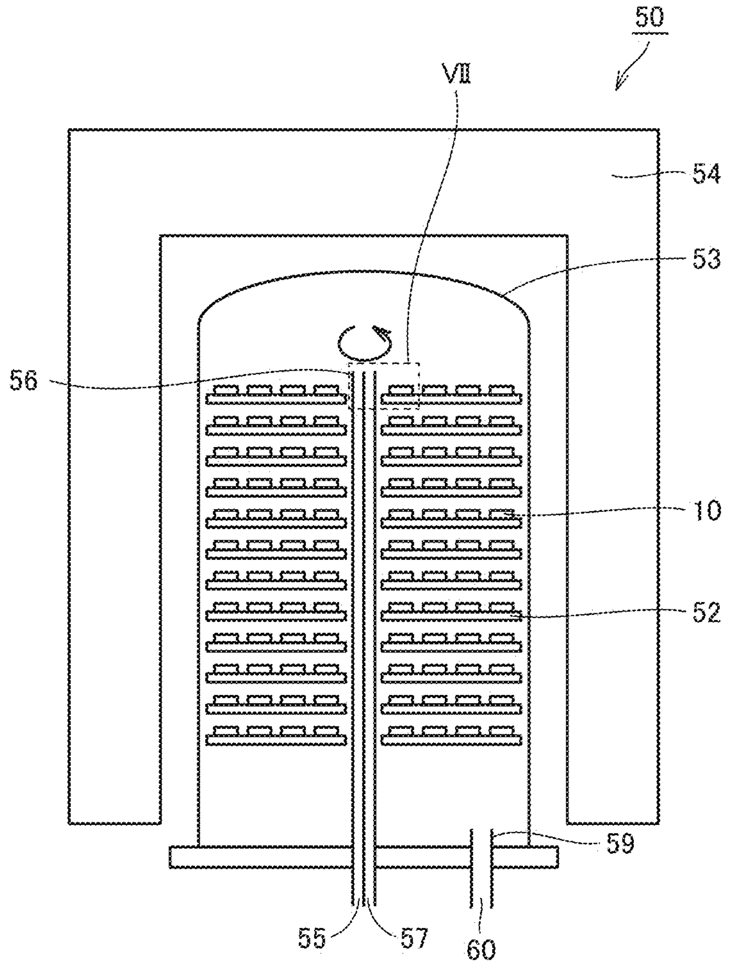
FIG. 6 is a schematic sectional view of an exemplary CVD apparatus for a method for manufacturing the cutting tool according to Embodiment 2.

The first layers of the samples are formed with the CVD apparatus shown in FIG. 6. Nozzle 56 shown in FIG. 8 was used for manufacturing samples described as "A" in the column "Type" of the column "Nozzle" in Table 3 and 4. Nozzle 56 comprises a first gas flow channel 55, a second gas flow channel 57, and a third gas flow channel 58. $SiCl_4$ gas passes through first gas flow channel 55, $TiCl_4$ gas passes through second gas flow channel 57, and $CH_3CN$ gas passes through third gas flow channel 58.

First gas flow channel 55 communicates with two first injection holes 55*a* and one second injection hole 55*b*. Gas passed through first gas flow channel 55 is injected from first injection holes 553 and second injection hole 55*b* to the substrates. Tables 3 and 4 show the diameters ϕ of first injection holes 55*a* and second injection hole 55*b*.

Second gas flow channel 57 communicates with a third injection hole 57*a*. Gas passed through second gas flow channel 57 is injected from third injection hole 57*a* to the substrates. Third gas flow channel 58 communicates with a fourth injection hole 58*a*. Gas passed through third gas flow channel 58 is injected from fourth injection hole 58*a* to the substrates.

Figure 9:
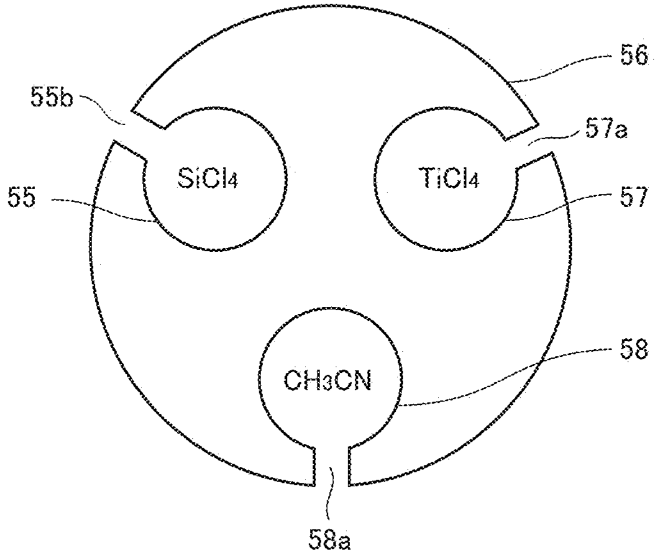
FIG. 9 is a sectional view of a nozzle used for Sample 1-3.

A nozzle 56 shown in FIG. 9 was used for manufacturing the sample described as "B" in the column "Type" of the column "Nozzle" in Tables, 3 and 4. Nozzle 56 comprises a first gas flow channel 55, a second gas flow channel 57, and a third gas flow channel 58. $SiCl_4$ gas passes through first gas flow channel 55, $TiCl_4$ gas passes through second gas flow channel 57, and $CH_3CN$ gas passes through third gas flow channel 58.

First gas flow channel 55 communicates with one second injection hole 55*b*. Gas passed through first gas flow channel 55 is injected front second injection hole 55*b* to the substrates. Second gas flow channel 57 communicates with a third injection hole 57*a*. Gas passed through Second gas flow channel 57 is injected from third injection hole 57*a* to the substrates. Third gas flow channel 58 communicates with a fourth injection hole 58*a*. Gas passed through third gas flow channel 58 is injected from fourth injection hole 58*a* to the substrates.

Table 3 and 4 show the percentage of V1 to V, (V1/V)×100; the number of rotation of the nozzle; the temperature of the substrate; and the pressure in the manufacturing of each sample with the proviso that V1 represents the volumetric flow rate of $SiCl_4$; and V represents the total volumetric flow rate of the reaction gases in the formation of the first layer.

The substrates were then cooled to obtain cutting tools as samples.

TABLE 3

| | Nozzle | | | Conditions for forming first layer | | | |
|---|---|---|---|---|---|---|---|
| Sample No. | Type | First injection hole Diameter ϕ mm | Second injection hole Diameter ϕ mm | (V1/V) × 100 | The number of rotation of nozzle rpm | Temperature of substrate ° C. | Pressure hPa |
| 1 | A | 0.6 | 0.4 | 0.4 | 4 | 810 | 58 |
| 2 | A | 1.6 | 0.8 | 1.2 | 4 | 870 | 70 |
| 3 | A | 2.4 | 1.6 | 2.0 | 4 | 870 | 90 |
| 4 | A | 1.6 | 0.6 | 1.2 | 4 | 880 | 65 |
| 5 | A | 1.6 | 1.4 | 1.2 | 4 | 880 | 85 |
| 6 | A | 1.6 | 0.8 | 1.2 | 4 | 880 | 70 |
| 7 | A | 1.6 | 0.8 | 1.2 | 4 | 880 | 70 |
| 8 | A | 1.6 | 1.4 | 1.2 | 4 | 880 | 85 |
| 9 | A | 1.6 | 1.4 | 1.2 | 4 | 880 | 85 |

TABLE 3-continued

| Sample No. | Type | Nozzle First injection hole Diameter φ mm | Nozzle Second injection hole Diameter φ mm | Conditions for forming first layer (V1/V) × 100 | The number of rotation of nozzle rpm | Temperature of substrate ° C. | Pressure hPa |
|---|---|---|---|---|---|---|---|
| 10 | A | 1.6 | 0.8 | 1.2 | 0.8 | 880 | 70 |
| 11 | A | 1.6 | 0.8 | 1.2 | 6 | 880 | 70 |
| 12 | A | 1.6 | 0.8 | 1.2 | 4 | 850 | 70 |
| 13 | A | 1.6 | 0.8 | 1.2 | 4 | 850 | 70 |
| 14 | A | 1.6 | 0.8 | 1.2 | 0.7 | 850 | 70 |
| 15 | A | 1.6 | 0.8 | 1.2 | 6.5 | 850 | 70 |
| 1-1 | A | 1.6 | 0.8 | 0.3 | 4 | 830 | 55 |
| 1-2 | B | Absent | 1.5 | 1.2 | 4 | 900 | 90 |
| 1-3 | B | Absent | 1.5 | 1.2 | 4 | 900 | 200 |

TABLE 4

| Sample No. | Type | Nozzle First injection hole Diameter φ mm | Nozzle Second injection hole Diameter φ mm | Conditions for forming first layer (V1/V) × 100 | The number of rotation of nozzle rpm | Temperature of substrate ° C. | Pressure hPa |
|---|---|---|---|---|---|---|---|
| 21 | A | 0.6 | 0.4 | 2.2 | 4 | 810 | 108 |
| 22 | A | 1.6 | 0.8 | 3.2 | 4 | 870 | 120 |
| 23 | A | 2.4 | 1.6 | 4.0 | 4 | 870 | 140 |
| 24 | A | 1.6 | 0.6 | 3.2 | 4 | 900 | 115 |
| 25 | A | 1.6 | 1.4 | 3.2 | 4 | 900 | 135 |
| 26 | A | 1.6 | 0.8 | 3.2 | 4 | 900 | 120 |
| 27 | A | 1.6 | 0.8 | 3.2 | 4 | 900 | 120 |
| 28 | A | 1.6 | 1.4 | 3.2 | 4 | 900 | 135 |
| 29 | A | 1.6 | 1.4 | 3.2 | 4 | 900 | 135 |
| 30 | A | 1.6 | 0.8 | 3.2 | 0.8 | 900 | 120 |
| 31 | A | 1.6 | 0.8 | 3.2 | 6 | 900 | 120 |
| 32 | A | 1.6 | 0.8 | 3.2 | 4 | 850 | 120 |
| 33 | A | 1.6 | 0.8 | 3.2 | 4 | 850 | 120 |
| 34 | A | 1.6 | 0.8 | 3.2 | 0.7 | 850 | 120 |
| 35 | A | 1.6 | 0.8 | 3.2 | 6.5 | 850 | 120 |
| 2-1 | A | 1.6 | 0.8 | 4.4 | 4 | 850 | 150 |
| 2-2 | B | Absent | 1.5 | 3.2 | 4 | 900 | 140 |
| 2-3 | B | Absent | 1.5 | 3.2 | 4 | 900 | 250 |

<Configuration of First Layer>

The first layers in the cutting tools as the samples were observed with a bright field scanning electron microscope (BF-SEM), so that it was confirmed that the first layer consisted of multiple hard particles.

<Crystal Structure of Hard Particles>

In the first layers of the cutting tools as the samples, the crystal structures of the hard particles were confirmed by selected area electron diffraction pattern analysis. Table 5 and 6 show the results. The "Cubic" in the tables indicates that the hard particles have a cubic crystal structure. The description "Cubic+Amorphous" in the tables means that the hard particles have a cubic crystal structure containing amorphous portions.

<Structure of First Layer>

The first layers of the cutting tools as the samples were measured for the percentage of the number of first hard particles having an aspect ratio of 3 or more N1 to the number of all the hard particles constituting the first layer N, (N1/N)×100. A specific measuring method therefor is as described in Embodiment 1. If the percentage, (N1/N)×100, is 60% or more, it is determined that the first layer has a columnar structure. If the percentage, (N1/N)×100, is less than 60%, it is determined that the first layer consists of granular crystals. Table 5 and 6 show the results of determination.

<Composition of First Layer>

The cutting tools as the samples were measured for, in the first layers, the average of the ratio of the number of silicon atoms $N_{Si}$ to the sum of the number of titanium atoms $N_{Ti}$ and the number of silicon atoms $N_{Si}$, $N_{Si}/(N_{Ti}+N_{Si})$, with a TEM-EDX. The specific measuring method therefor is as described in Embodiment 1. Table 1 and 2 show the results.

<Presence or Absence of Lamellar Structure>

The hard particles of the cutting tools as the samples consist of titanium, silicon, carbon, and nitrogen. It was confirmed whether the lamellar structure in which the content of silicon changed periodically was present or absent in the hard particles of the cutting tools as the samples. The specific method for confirming the lamellar structure is as described in Embodiment 1. Tables 5 and 6 show the results.

<First Graph>

The hard particles of the cutting tools as the samples were subjected to line analysis with a TEM-EDX to obtain a first graph. Tables 5 and 6 show "Average of first minimum values and third minimum values". "Average of second minimum values", and "Average of first maximum values and second maximum values" in the first graph of each sample, and "Cycle width" in the direction along the X-axis in the first graph. In each graph of Samples 1-2 and 2-2, the content of silicon had only one maximum value (first maximum value) and neither second minimum value nor second maximum value between two minimum values that were relatively the lowest (in a cycle). The average of the content of silicon as the first maximum value is therefore described in the columns "Average of first maximum values and second maximum values" in the tables.

TABLE 5

| | | Hard particles | | | | | |
|---|---|---|---|---|---|---|---|
| Sample No. | First layer Structure | Crystal structure | Lamellar structure | Average of first minimum values and third minimum values | Average of second minimum values | Average of first maximum values and second maximum values | Cycle width nm |
| 1 | Columnar structure | Cubic | Present | 0.003 | 0.008 | 0.014 | 6.5 |
| 2 | Columnar structure | Cubic | Present | 0.010 | 0.020 | 0.040 | 6.5 |
| 3 | Columnar structure | Cubic | Present | 0.030 | 0.040 | 0.060 | 6.4 |
| 4 | Columnar structure | Cubic | Present | 0.010 | 0.015 | 0.040 | 6.7 |
| 5 | Columnar structure | Cubic | Present | 0.010 | 0.035 | 0.040 | 6.9 |
| 6 | Columnar structure | Cubic | Present | 0.010 | 0.020 | 0.040 | 6.5 |
| 7 | Columnar structure | Cubic | Present | 0.010 | 0.020 | 0.040 | 6.4 |
| 8 | Columnar structure | Cubic | Present | 0.010 | 0.035 | 0.040 | 6.5 |
| 9 | Columnar structure | Cubic | Present | 0.010 | 0.035 | 0.040 | 6.4 |
| 10 | Columnar structure | Cubic | Present | 0.010 | 0.020 | 0.040 | 29.3 |
| 11 | Columnar structure | Cubic | Present | 0.010 | 0.020 | 0.040 | 4.2 |
| 12 | Columnar structure | Cubic | Present | 0.010 | 0.020 | 0.040 | 6.5 |
| 13 | Columnar structure | Cubic | Present | 0.010 | 0.020 | 0.040 | 6.4 |
| 14 | Columnar structure | Cubic | Present | 0.010 | 0.020 | 0.040 | 31.5 |
| 15 | Columnar structure | Cubic | Present | 0.010 | 0.020 | 0.040 | 3.7 |
| 1-1 | Columnar structure | Cubic | Present | 0.003 | 0.005 | 0.010 | 6.5 |
| 1-2 | Columnar structure | Cubic | Present | 0.010 | — | 0.040 | 6.5 |
| 1-3 | Granular crystal | Cubic + Amorphous | Absent | — | — | — | — |

TABLE 6

| | | Hard particles | | | | | |
|---|---|---|---|---|---|---|---|
| Sample No. | First layer Structure | Crystal structure | Lamellar structure | Average of first minimum values and third minimum values | Average of second minimum values | Average of first maximum values and second maximum values | Cycle width nm |
| 21 | Columnar structure | Cubic | Present | 0.050 | 0.058 | 0.064 | 7.0 |
| 22 | Columnar structure | Cubic | Present | 0.060 | 0.070 | 0.090 | 7.0 |

TABLE 6-continued

| Sample No. | First layer Structure | Hard particles Crystal structure | Lamellar structure | Average of first minimum values and third minimum values | Average of second minimum values | Average of first maximum values and second maximum values | Cycle width nm |
|---|---|---|---|---|---|---|---|
| 23 | Columnar structure | Cubic | Present | 0.080 | 0.090 | 0.110 | 6.9 |
| 24 | Columnar structure | Cubic | Present | 0.060 | 0.065 | 0.090 | 7.2 |
| 25 | Columnar structure | Cubic | Present | 0.060 | 0.085 | 0.090 | 7.4 |
| 26 | Columnar structure | Cubic | Present | 0.060 | 0.070 | 0.090 | 7.0 |
| 27 | Columnar structure | Cubic | Present | 0.060 | 0.070 | 0.090 | 6.9 |
| 28 | Columnar structure | Cubic | Present | 0.060 | 0.085 | 0.090 | 7.0 |
| 29 | Columnar structure | Cubic | Present | 0.060 | 0.085 | 0.090 | 6.9 |
| 30 | Columnar structure | Cubic | Present | 0.060 | 0.070 | 0.090 | 29.8 |
| 31 | Columnar structure | Cubic | Present | 0.060 | 0.070 | 0.090 | 4.7 |
| 32 | Columnar structure | Cubic | Present | 0.060 | 0.070 | 0.090 | 7.0 |
| 33 | Columnar structure | Cubic | Present | 0.060 | 0.070 | 0.090 | 6.9 |
| 34 | Columnar structure | Cubic | Present | 0.060 | 0.070 | 0.090 | 32.0 |
| 35 | Columnar structure | Cubic | Present | 0.060 | 0.070 | 0.090 | 4.2 |
| 2-1 | Columnar structure | Cubic | Present | 0.090 | 0.100 | 0.120 | 6.9 |
| 2-2 | Columnar structure | Cubic | Present | 0.060 | — | 0.090 | 7.0 |
| 2-3 | Granular crystal | Cubic + Amorphous | Absent | — | — | — | — |

<Cutting Test>

Cutting was performed with the cutting tools as the samples under the following cutting conditions described in Cutting test 1 or Cutting test 2. Cutting times were measured until the widths of the flank faces damaged reached 0.3 mm. Longer cutting time means a longer tool life. Tables 7 and 8 show the results.

<<Cutting Test 1: Samples 1 to 15 and Samples 1-1 to 1-3>>

Material to be cut: round rod-shaped SCM435 material with flutes
Holder: DCLNR2525M12
Insert: CNMG120408N-GU
Cutting speed Vc: 200 m/min
Feed f: 0.3 mm/rev
Cutting depth ap: 1.5 mm
Cutting fluid: present (WET)

TABLE 7

| Sample No. | Cutting test 1 Cutting time (minute) |
|---|---|
| 1 | 55 |
| 2 | 57 |
| 3 | 51 |
| 4 | 50 |
| 5 | 51 |
| 6 | 40 |
| 7 | 41 |
| 8 | 61 |
| 9 | 59 |
| 10 | 51 |

TABLE 7-continued

| Sample No. | Cutting test 1 Cutting time (minute) |
|---|---|
| 11 | 50 |
| 12 | 32 |
| 13 | 32 |
| 14 | 40 |
| 15 | 41 |
| 1-1 | 31 |
| 1-2 | 25 |
| 1-3 | 20 |

<<Cutting Test 2: Samples 21 to 35 and Samples 2-1 to 2-3>>

Material to be cut: round rod-shaped SCM435 material with flutes
Holder: DCLNR2525M12
Insert: CNMG120408N-GU
Cutting speed Vc: 400 m/min
Feed f: 0.15 mm/rev
Cutting depth ap: 1.5 mm
Cutting fluid: present (WET)

TABLE 8

| Sample No. | Cutting test 2 Cutting time (minute) |
|---|---|
| 21 | 50 |
| 22 | 52 |

TABLE 8-continued

| Sample No. | Cutting test 2 Cutting time (minute) |
|---|---|
| 23 | 46 |
| 24 | 45 |
| 25 | 46 |
| 26 | 39 |
| 27 | 40 |
| 28 | 56 |
| 29 | 54 |
| 30 | 46 |
| 31 | 45 |
| 32 | 36 |
| 33 | 37 |
| 34 | 36 |
| 35 | 38 |
| 2-1 | 35 |
| 2-2 | 20 |
| 2-3 | 15 |

<Discussion Based on Cutting Conditions>

The cutting tools as Samples 1 to 15 correspond to Examples, and the cutting tools as Samples 1-1 to 1-3 correspond to Comparative Examples. The results of Cutting test 1 confirmed that the cutting tools had longer tool lives than the cutting tool of Comparative Examples in the intermittent machining of chromium molybdenum steel, which was comparatively likely to be welded to the cutting tools especially at low speed.

Sample 1-2 did not have the second minimum value in first graph. It was conjectured that therefore, Sample 1-2 scarcely enabled obtaining the effect of reducing the lattice strain due to the difference between the first minimum value and the third minimum value and the first maximum value, was likely to develop cracks orthogonally to the stacking directions of the lamellar structure, and deteriorated in the tool life.

<Discussion Based on Cutting Conditions 2>

The cutting tools as Samples 21 to 35 correspond to Examples, and the cutting tools as Samples 2-1 to 2-3 correspond to Comparative Examples. The results of Cutting test 2 confirmed that the cutting tools of Examples had longer tool lives than the cutting tools of Comparative Examples in the intermittent machining of chromium molybdenum steel, which was likely to abrade especially at high speed.

Sample 2-2 did not have the second minimum value in a cycle in the first graph. It was Conjectured that therefore, Sample 2-2 scarcely enabled obtaining the effect of reducing the lattice strain due to the difference between the first minimum value and the third minimum value and the first maximum value, was likely to develop cracks orthogonally to the stacking directions of the lamellar structure, and deteriorated in the tool life.

Although the embodiments and Examples of the present disclosure were described as mentioned above, it has been originally expected that the embodiments and Examples mentioned above are optionally combined or variously modified. The embodiments and Examples disclosed this time are exemplary in all respects, and should be considered to be unlimited. The scope of the present invention is indicated by Claims rather than by the above-mentioned embodiments and Examples. The scope of the present invention is intended to include all the modifications within the scope and meaning equivalent to Claims.

REFERENCE SIGNS LIST

1 Cutting tool; 10 Substrate; 11 First layer; 12 Second layer; 13 Third layer; 15 Coating; 50 CVD apparatus; 52 Substrate-setting jig; 53 Reaction vessel; 54 Thermostat; 55 First gas flow channel; **55*a* First injection hole; 55*b* Second injection hole; 56 Nozzle; 57 Second gas flow channel; 57*a* Third injection hole; 58 Third gas flow channel; 58*a* Forth injection hole; 59 Exhaust pipe; 60** Exhaust port.

The invention claimed is:

1. A cutting tool, comprising a substrate and a coating disposed on the substrate, wherein the coating comprises a first layer, the first layer consists of multiple hard particles, the hard particles consist of titanium, silicon, carbon, and nitrogen, the hard particles have a cubic crystal structure, the first layer has a columnar structure, in the first layer, an average of a ratio of the number of atoms of the silicon $N_{Si}$ to a sum of the number of atoms of the titanium $N_{Ti}$ and the number of atoms of the silicon $N_{Si}$, $N_{Si}/(N_{Ti}+N_{Si})$, is 0.010 or more and 0.10 or less, the hard particles have a lamellar structure in which a content of the silicon changes periodically, in a first graph showing results obtained by subjecting the hard particles to line analysis along a stacking direction of the lamellar structure with an energy dispersive X-ray spectroscope attached to a transmission electron microscope, in a coordinate system having X-axis indicating a distance from any point, P1, in the hard particles, and Y-axis indicating the ratio $N_{Si}/(N_{Ti}+N_{Si})$, each cycle of the ratio $N_{Si}/(N_{Ti}+N_{Si})$ includes a first minimum value, a first maximum value, a second minimum value, a second maximum value, and a third minimum value along the positive direction of the X-axis, and an average of the second minimum values is higher than an average of the first minimum values and the third minimum values.

2. The cutting tool according to claim 1, wherein the cycle width in a direction along the X-axis in the first graph is 3 nm or more and 20 nm or less.

3. The cutting tool according to claim 1, wherein a difference between an average of the first maximum values and the second maximum values and the average of the second minimum values is 0.005 or more and 0.040 or less.

4. The cutting tool according to claim 1, wherein the first layer has a thickness of 1.0 μm or more and 15 μm or less.

5. The cutting tool according to claim 1, wherein the coating comprises a second layer disposed between the substrate and the first layer, and the second layer comprises at least one selected from the group consisting of a TiN layer, a TiC layer, a TiCN layer, a TiBN layer, a TiCNO layer, and an $Al_2O_3$ layer.

6. The cutting tool according to claim 1, wherein the coating comprises a third layer disposed on the outermost surface the coating, and the third layer is a TiN layer, a TiC layer, a TiCN layer, a TiBN layer, a TiCNO layer, or an $Al_2O_3$ layer.

* * * * *